(12) United States Patent
Reilly et al.

(10) Patent No.: US 7,047,043 B2
(45) Date of Patent: May 16, 2006

(54) MULTI-CHANNEL DEMODULATION WITH BLIND DIGITAL BEAMFORMING

(75) Inventors: James Reilly, Hamilton (CA); Dean McArthur, Burlington (CA); Peter J. Edmonson, Hamilton (CA)

(73) Assignee: Research In Motion Limited, Waterloo (CA)

(*) Notice: Subject to any disclaimer, the term of this patent is extended or adjusted under 35 U.S.C. 154(b) by 646 days.

(21) Appl. No.: 10/163,912

(22) Filed: Jun. 6, 2002

(65) Prior Publication Data
US 2004/0198450 A1 Oct. 7, 2004

(51) Int. Cl.
*H04B 1/38* (2006.01)
*H04B 1/06* (2006.01)
*H04J 3/04* (2006.01)

(52) U.S. Cl. .............. 455/561; 455/562.1; 455/132; 455/272; 455/275; 455/334; 455/338; 370/535; 370/319; 370/342

(58) Field of Classification Search .............. 455/313, 455/324, 561, 562.1, 500, 501, 504, 506, 455/63.1, 63.4, 65, 132, 136, 334, 338, 272, 455/275; 370/535, 536, 319, 320, 321, 307, 370/478–480, 442; 342/368, 373, 378

See application file for complete search history.

(56) References Cited

U.S. PATENT DOCUMENTS

| | | | | |
|---|---|---|---|---|
| 4,639,914 A * | 1/1987 | Winters | ...................... | 370/334 |
| 5,268,695 A * | 12/1993 | Dentinger et al. | ..... | 342/357.11 |
| 5,383,164 A * | 1/1995 | Sejnowski et al. | .......... | 367/134 |
| 5,592,490 A * | 1/1997 | Barratt et al. | ................ | 370/310 |
| 5,621,730 A * | 4/1997 | Kelley | ......................... | 370/345 |
| 5,917,448 A * | 6/1999 | Mickelson | .................. | 342/442 |
| 6,069,583 A * | 5/2000 | Silvestrin et al. | ....... | 342/357.01 |
| 6,185,309 B1 * | 2/2001 | Attias | ........................ | 381/94.1 |
| 6,240,098 B1 * | 5/2001 | Thibault et al. | ............ | 370/431 |
| 6,625,587 B1 * | 9/2003 | Erten et al. | ................... | 706/22 |
| 2002/0154687 A1 * | 10/2002 | Bierly et al. | ................ | 375/222 |

* cited by examiner

*Primary Examiner*—Duc M. Nguyen
(74) *Attorney, Agent, or Firm*—Jones Day; Krishna K. Pathiyal; Robert C. Liang (57) ABSTRACT

A communication signal receiver and associated method are disclosed. A plurality of communication signals are received at an atenna array and time multiplexed into a single multiplexed signal. Each of the communication signals comprises an unknown mixture of a plurality of source signals from a plurality of communication signal sources. A signal separation network is configured to separate the K source signals from the multiplexed signal.

37 Claims, 4 Drawing Sheets

MULTI-CHANNEL DEMODULATION WITH BLIND DIGITAL BEAMFORMING

BACKGROUND OF THE INVENTION

1. Field of the Invention

This invention relates generally to blind signal separation, and in particular to blind down conversion of multiple co-channel and adjacent channel radio frequency (RF) signals into separate baseband signals with low crosstalk and suppression of interference.

2. Description of the Related Art

Wireless voice and data communication products and services have experienced tremendous growth in popularity in recent years, leading to spectral congestion and interference. Interference may be caused by multiple communication signals on a single channel, generally referred to as co-channel interference, or by communication signals on adjacent channels or networks. Such spectral congestion and interference have typically resulted in temporary short-term service problems or outages. However, as competition for services increases and customer satisfaction becomes more critical, such service outages, even if temporary, will no longer be tolerated and technical solutions to increase network capacity and improve robustness to interference are therefore desirable.

Another concern for existing communication networks is the need to offer increased data rates. For many existing networks, one solution is the implementation of a Quality-of-Service (QoS) facility, whereby users can be assigned multiple data channels according to communication resource requirements, dependent upon a software application currently being used on a wireless mobile communication device ("mobile device"), for example. For mobile devices, processing multiple data channels is difficult to implement using known designs without significantly increasing hardware complexity, power dissipation and size.

These problems were identified as early as the 1980's, and significant research has since been conducted. These efforts have focused primarily on modifying known radio receivers by adding a spatial filter or beamformer (See for example R. T. Compton Jr., *Adaptive Antennas: Concepts and Performance*, Prentice Hall, Englewood Cliffs, N.J., 1988, and R. Monzingo and T. Miller, *Introduction to Adaptive Arrays*, Wiley and Sons, New York, 1980). More recently, methods based on the statistical independence of source signals have been developed. In both cases, spatial information obtained using an array antenna is exploited. However, array antenna size and associated receiver complexity and high power consumption prevent widespread implementation of such techniques.

SUMMARY OF THE INVENTION

A communication signal receiver is provided, comprising an antenna array having a plurality of M antenna elements, each of the M antenna elements receiving a respective communication signal, and each communication signal comprising a mixture of K source signals from a plurality of K communication signal sources, a multiplexer coupled to the antenna array for time multiplexing the M communication signals received by the M antenna elements into a single multiplexed signal, and a signal separation network configured to separate the K source signals from the multiplexed signal.

A method for receiving communication signals is also provided, and comprises the steps of receiving a plurality of M communication signals, each communication signal comprising an unknown mixture of a plurality of K source signals, time multiplexing the plurality of M communication signals into a single multiplexed signal, and separating each of the K source signals from the multiplexed signal.

A wireless communication device according to a further aspect of the invention comprises a communication signal receiver, a communication signal transmitter, and an array of M antenna elements, each antenna element receiving a respective communication signal, each communication signal comprising an unknown mixture of a plurality of K source signals generated by a plurality of K signal sources. The receiver may comprise a multiplexer configured to time multiplex the plurality of received communication signals into a single multiplexed signal and a blind signal separation unit configured to separate each of the K source signals from the multiplexed signal.

DETAILED DESCRIPTION OF PREFERRED EMBODIMENTS

Figure 1:
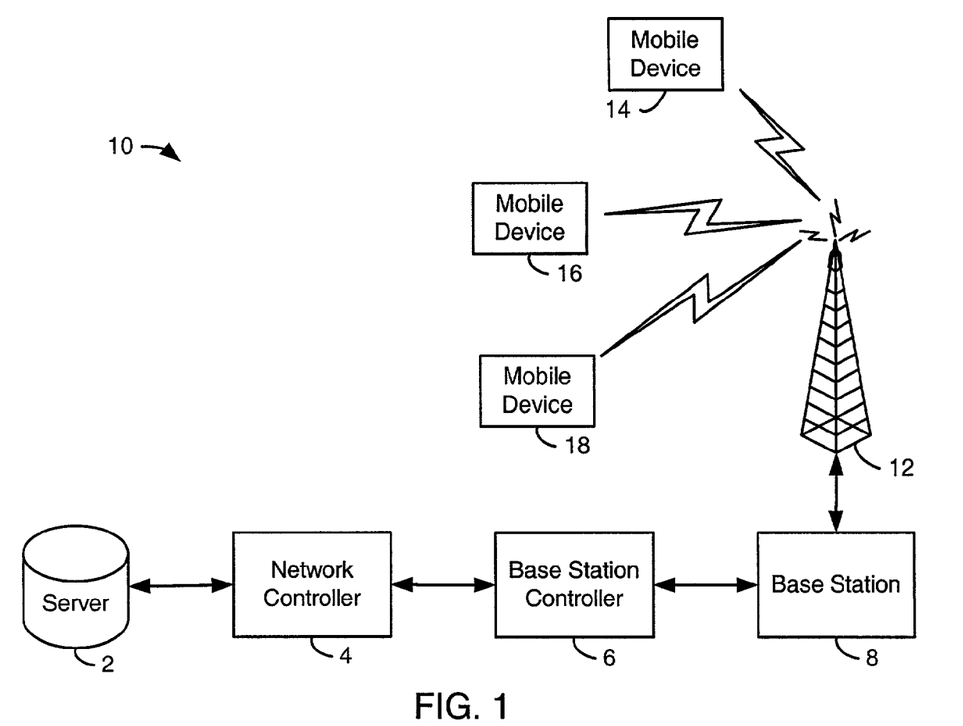
FIG. 1 is a block diagram of a typical wireless communication system.

FIG. 1 is a block diagram of a typical wireless communication system. The example communication system 10 includes a server 2, a network controller 4, a base station controller 6, a base station 8 and an antenna, shown in FIG. 1 as a tower, 12. Mobile devices 14, 16, 18 may exchange information with the base station 8 and the rest of the system via one or more channels on wireless communication links.

The server 2 may be any component or system connected within or to the communication system 10. For example, the server 2 may be a service provider system which provides wireless communication services to the mobile devices 14, 16, 18, and stores data required for routing a communication signal to the mobile devices 20. The server 2 may also be a gateway to other networks, including but in no way limited to a telephone network, a local area network, or a wide area network such as the Internet. Although only a single server 2 is shown in FIG. 1, a communication system may include further additional network storage, processing, routing and gateway components.

A network controller 4 normally handles routing of communication signals to a destination mobile device. In the context of a packet switched communication network, the network controller 4 determines a location or address of a destination mobile device and routes packets for the mobile device through one or more routers or switches (not shown)

and eventually to a base station 8 serving a network coverage area in which the destination mobile device is currently located.

A base station 8 and its associated controller 6 and antenna or tower 12 provide wireless network coverage for a particular coverage area commonly referred to as a "cell". The base station 8 transmits communication signals to and receives communication signals from mobile devices 14, 16, 18 within its cell via the antenna 12. A base station 8 normally performs such functions as modulation and possibly encoding and/or encryption of signals to be transmitted to a mobile device 14, 16, 18 in accordance with particular, usually predetermined, communication protocols and parameters, under the control of the base station controller 6. The base station 8 similarly demodulates and possibly decodes and decrypts if necessary any communication signals received from mobile devices 14, 16, 18 within its cell. Communication protocols and parameters may vary between different networks. For example, one network may employ a different modulation scheme and operate at different frequencies than other networks.

Actual wireless communication systems, such as the Mobitex™ network or DataTAC™ network for example, may include hundreds of cells, each served by a distinct base station controller 6, base station 8 and transceiver 12, depending upon the desired overall expanse of network coverage. The base station controllers 6 and base stations 8 may be connected by multiple switches and routers (not shown), controlled by multiple network controllers 4, only one of which is shown in FIG. 1. Similarly, as described above, the network 10 may also include a plurality of servers 2, including for example storage, routing, processing and gateway components.

Although the following description focuses primarily on signals received at a base station such as 8, similar signal detection and processing techniques may also be employed at each of the mobile devices 14, 16, 18.

At the base station 8, the antenna 12 receives signal components from each mobile device 14, 16, 18. In the general case of K signal sources, the baseband signal for the $k^{th}$ source can be expressed in complex-envelope form as $$\tilde{s}_k(t) = a_k(t) e^{j\alpha_k(t)}, \quad k=1 \ldots K \quad (1)$$

where $$j = \sqrt{-1}$$

$a_k(t)$ is a function describing the amplitude of the $k^{th}$ source at time t;

$\alpha_k(t)$ is a function describing the phase of the $k^{th}$ source at time t; and $a_k(t)$ and $\alpha_k(t)$ are real-valued, low-pass functions.

In regard to notation used herein, a tilde "~" over a symbol indicates the complex envelope version of the quantity, whereas a hat "^" over a symbol indicates an estimate. The presence of both symbols indicates the estimate of the complex envelope.

For each source, a baseband signal is modulated to occupy an assigned frequency channel with center frequency $f_k$. Thus, the RF signal transmitted by each source is given by $$s_k(t) = R\{\tilde{s}_k(t) e^{j2\pi f_k(t)}\}, \quad k=1 \ldots K \quad (2)$$

where $$f_k = f_{base} + \Delta f_k;$$

$f_{base}$ is the base frequency of a block of channels;
$\Delta f_k$ is the channel offset of the $k^{th}$ source; and
$R\{\cdot\}$ denotes the real part of the argument.

At a receiver, if an M-element antenna is used to detect signals and negligible additive noise is assumed, then the output of an $m^{th}$ antenna element is $$r_m(t) = \sum_{k=1}^{K} s_k(t - \delta_{mk}), \quad m = 1 \ldots M, \quad (3)$$

where $\delta_{mk}$ is the relative transmission delay from the $k^{th}$ source to the $m^{th}$ antenna element, and all delays are arbitrarily determined with respect to the first element (antenna) of the receiver array.

Figure 2:
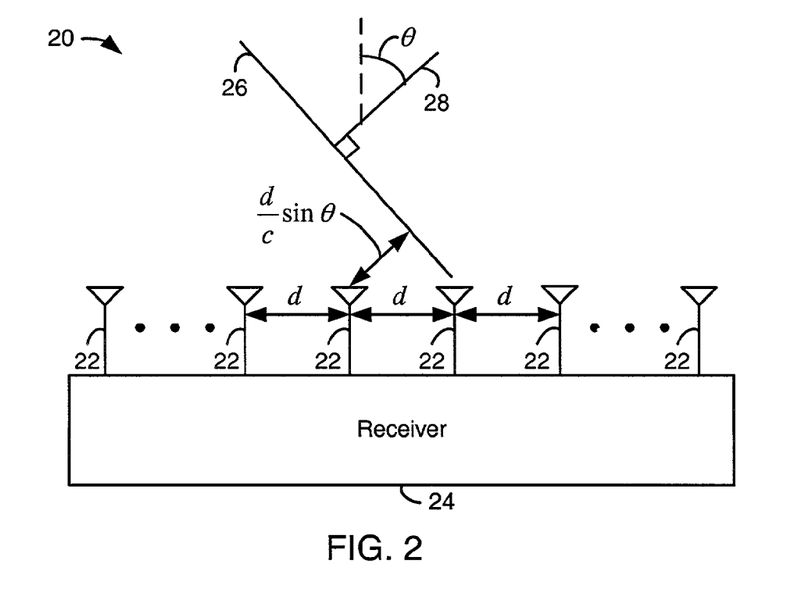
FIG. 2 is a block diagram of a receiver having a linear antenna array.

FIG. 2 is a block diagram of a receiver having a linear antenna array. The receiver 24 may be implemented in the base station 8 or a mobile device 14, 16, 18, and includes a plurality of antenna elements 22 forming a linear antenna array. From the following discussion of FIG. 2, extension to other antenna array geometries will be obvious to those skilled in the art.

For the linear array in FIG. 2, the delay $\delta_{mk}$ can be made equal to $$\delta_{mk} = \frac{2\pi f_k (m-1) d}{c} \sin(\theta_k), \quad m = 1, \ldots M, k = 1 \ldots K, \quad (4)$$

where
c is the speed of propagation of a received signal;
d is the distance between the antenna array elements 22; and
$\theta_k$ is the angle of arrival for the $k^{th}$ source, represented in FIG. 2 as an angle relative to a line 28 normal to a direction of arrival 26 of a signal from the $k^{th}$ source.

Since the bandwidth of the sources $s_k(t)$ can be assumed to be much less than $1/\delta_{mk}$ for all values of m and k, then $a_k(t)$ and $\alpha_k(t)$ are approximately constant across the array and it follows from (3) above that $$r_m(t) = \sum_{k=1}^{K} s_k(t) e^{j(m-1)\phi_k}, \quad m = 1 \ldots M. \quad (5)$$

In practical scenarios, it may be assumed that $f_{base} \gg \Delta f_k$, and a wavelength $$\lambda \approx \lambda_k = \frac{c}{f_{base}}$$

may be defined. Then, $\phi_k$ in (5) is given as $$\phi_k = \frac{2\pi d}{\lambda} \sin(\theta_k). \quad (6)$$

If the antenna elements 22 are synchronously sampled at time instants t=nT, then the resulting snapshot from the antenna elements 22 can be expressed in matrix notation as $$r(nT) = \Theta s(nT), \quad (7)$$

where $$\Theta = \begin{bmatrix} 1 & \cdots & 1 \\ e^{j\phi_1} & & e^{j\phi_N} \\ \vdots & & \vdots \\ e^{j(M-1)\phi_1} & \cdots & e^{j(M-1)\phi_N} \end{bmatrix}.$$

Expression (7) is the well-known narrowband direction-of-arrival model.

It will be apparent from (7) that r(nT) is a linear combination of the modulated source signals s(nT). In particular, the received signal vector r(nT) of length M is a linear combination or mixture of the K source signals received at the M antenna elements 22, where the K-source by M-output mixing system is described by the matrix $\Theta$.

Blind signal separation (BSS) techniques exist that can recover estimates of the original signal sources, using only the received data. BSS methods depend only on the sources being statistically independent. A BSS algorithm is typically applied after received signals have been demodulated and discretized. In order to find an estimate $\hat{\tilde{s}}(n)$ of $\tilde{s}(n)$, a K by M separation matrix is first identified. The separation matrix B satisfies the condition $$B\Theta = P, \quad (8)$$

where P is a permutation of a K by K diagonal matrix. Therefore, $$\hat{\tilde{s}}(n) = B\tilde{r}(n) = P\tilde{s}(n), \quad (9)$$

where $\tilde{s}(n) = [\tilde{s}_1(n), \ldots \tilde{s}_K(n)]^T$ is a K-length vector of samples of the complex envelope of the source signals at the nth time instant, and $\tilde{r}(n) = [\tilde{r}_1(n), \ldots \tilde{r}_M(n)]^T$ is an M-length vector of samples of the complex envelope of the received signals at the nth time instant from all elements of the array.

Thus, multiplication by B recovers or unmixes the source signals $\tilde{s}(n)$ from the received mixture $\tilde{r}(n)$. Equation (9) is a mathematical expression of the concept that source signals can only be recovered to within a permutation of the source indexing and to within an unknown gain. Note that the source signals are recovered blindly, without any knowledge of the source signals or the mixing matrix $\Theta$.

Other known received signal processing schemes use so-called beamforming techniques to isolate a source of interest from a mixture of received signals using an antenna array. Contrary to BSS techniques, beamforming methods are not blind. They require some knowledge of a desired signal, usually in the form of the direction of arrival of the desired signal. In the narrowband case, the beamformer output $\hat{\tilde{s}}_b(k,n)$ for the kth source is formed by $$\hat{\tilde{s}}_b(k,n) = w_k^H r(n), \quad (10)$$

where the M-length vector $w_k$ contains a set of complex-valued weights chosen to isolate the kth source and superscript $^H$ denotes the Hermitian transpose. Several beamforming methods exist which yield a vector $w_k$ so that the recovered source signal is a close replica of the desired source signal $\tilde{s}_k(n)$.

Beamforming algorithms, which yield a suitable vector $w_k$ in (10), have been widely applied and recently, so-called "smart antennas" employing such algorithms have been introduced into wireless communications systems. Although these general beamforming solutions have shown success in some mobile environments, severe degradation has been observed when the environment contains large multipath components.

Recently, beamforming methods tailored to multipath environments have been developed. A review of some of these methods appears for example in Foschini, G., "Layered Space-time Architecture of Wireless Communication in a Fading Environment when Using Multiple Antennas", *Bell Labs Technical Journal*, vol. 1, No. 2, pp. 41–59, Autumn 1994; Golden, G., G. Foschini, P. Wolniansky, and R. Valenzuela, "V-BLAST: A High Capacity Space-time Architecture for the Rich-Scattering Wireless Channel", *Fifth Workshop on Smart Antennas in Wireless Mobile Communications*, Stanford Univ., July 1998 and Wolniansky, P., G. Foschini, G. Golden, and R. Valenzuela, "V-BLAST: An architecture for Realizing Very High Data Rates Over the Rich-Scattering Wireless Channel", invited paper to Proc. ISSSE-98, Pisa, Italy, September 1998. In general, these methods exploit knowledge of a source's modulation or message format to compute a spatial equalizer. These equalization methods are equivalent to known time equalization methods summarized in Haykin, S., *Array Signal Processing*, New Jersey: Prentice-Hall, 1985, and Haykin, S., *Adaptive Filter Theory*, New Jersey: Prentice-Hall, 1996.

Although beamforming has a long history in military applications, typical commercial radio implementations require expensive array antennas that are commercially impractical. Further, these beamformer procedures are generally based on parametric models for the antenna response, and their performance can be severely degraded by additive noise and antenna nonuniformities such as calibration errors. Thus, the challenge of making an affordable array antenna and identifying a robust signal-processing algorithm has prevented these approaches from becoming commercially accepted.

An alternative approach to beamforming, as described herein, is based on BSS. In principle, BSS techniques have the potential to overcome many of the problems with the non-blind beamforming algorithms cited above. Although the overall hardware configuration for the blind case is similar to that for traditional (non-blind) beamformers, the method of identifying the separating matrix B in (8) is significantly different from the method of identifying the beamforming vector $w_k$ in (10). Blind processing techniques lead to methods that are very robust to errors in calibration and array models.

A principal difficulty with blind signal approaches is to find efficient methods of evaluating the statistical independence between sources or data sequences. Since the joint probability density function (pdf) of r(n) may contain an infinite number of moments and independence requires all cross-moments to be zero, it is impractical to use a direct test for independence. Consequently, alternative contrast functions are used, which typically involve a nonlinear transformation of a received signal to a lower dimensionality where validating the cross-moments is easier to perform.

In Cardoso, J-F and A. Souloumiac, "Blind Beamforming for Non Gaussian Signals". IEE Proc. F, Vol. 140, No. 6, pp. 362–370, December 1993, a different approach is proposed. Under this approach, the matrix B is partitioned into $$B = B_r B_w, \quad (11)$$

where $B_w$ is a K by M whitening matrix that satisfies $E(B_w R(n) B_w^H) = I$;

$B_r$ is a K by K unitary matrix; and $R(n) = E(\tilde{r}(n)\tilde{r}^H(n))$ is the received signal covariance matrix.

$B_w$ can be identified from an estimate of R(n). Thus, $B_w$ corresponds, for example, to the inverse of the Cholesky decomposition of $\hat{R}(n)$ and procedures are known to identify it. A popular sequential update expression for $B_w$ is given in Cardoso and Souloumiac as $$B_w(n+1)=B_w(n)-\lambda_s[B_w(n)r(n)r(n)^H B_w(n)^H - I]B_w(n), \quad (12)$$

where $\lambda_s$ is an adaptation rate or learning rate parameter. The quantities above are denoted as being functions of the time-step index n, since these quantities are updated at every value of this index.

The remaining challenge is to adaptively update $B_r$. One known method, proposed by Cardoso and Souloumiac, leads to the expression $$B_r(n+1)=B_r(n)-\lambda_s[\upsilon(s(n))s(n)-s(n)\upsilon(s(n))]B_r(n), \quad (13)$$

where $\upsilon(s(n))$ is a skew-symmetric function applied element-wise to its vector argument.

By combining expressions (12) and (13), a first-order approximation of B(n) is given as $$B(n+1)=B(n)-\lambda_s[s(n)s(n)^H - I + \upsilon(s(n))s(n) - s(n)\upsilon(s(n))^H]B(n). \quad (14)$$

A second known method of estimating $B_r$ is described in Bell, A. and T. Sejnowski, "Blind Separation and Blind Deconvolution: An Information-Theoretic Approach", *Proc. ICASSP*, (Detroit), 1995, and uses the estimation $$B_r(n+1)=B_r(n)+\lambda_s[I-2\tan(s(n))s(n)^H]. \quad (15)$$

As seen in equation (9), the original source signals are recovered by multiplying the received signal vector, which is a mixture of the sources, by the separating matrix B. If, for example, one of the sources is a desired signal while another represents undesired interference, the BSS procedure can then separate the desired source signal from the interfering source. Since the desired source is extracted, a BSS algorithm can thereby suppress interference, through the use of an antenna array. If the received signal consists of a mixture of two desired sources, each from a different mobile device for example, and one interfering source, the BSS scheme not only suppresses interference, but also can separate the two desired signals from each other as well. Thus, the same channel can be used to support multiple mobile devices, provided that the number of antenna elements (M) is equal to or greater than the number of sources (K).

The addition of a beamforming antenna to a conventional radio receiver has the potential to improve the performance of the receiver in the presence of strong interference, since joint space-frequency filtering provides better interference rejection than simple channel or frequency-selective filtering alone. An array antenna also supports co-channel subscribers in the same cell. In addition, blind techniques have advantages over their non-blind counterparts, including the fact that the blind methods are robust to antenna non-uniformities and array modeling errors.

However, an array antenna requires that each output channel be passed through a down conversion stage. This stage is expensive and significantly increases the size and power consumption of the device.

The cost, complexity and power consumption of previous antenna array implementations have limited their application in wireless communications. To overcome these limitations and provide a solution that is practical for not only basestations, but also mobile devices with more limited size, power consumption and processing resources, a time-multiplexed array antenna may be used.

Figure 3:
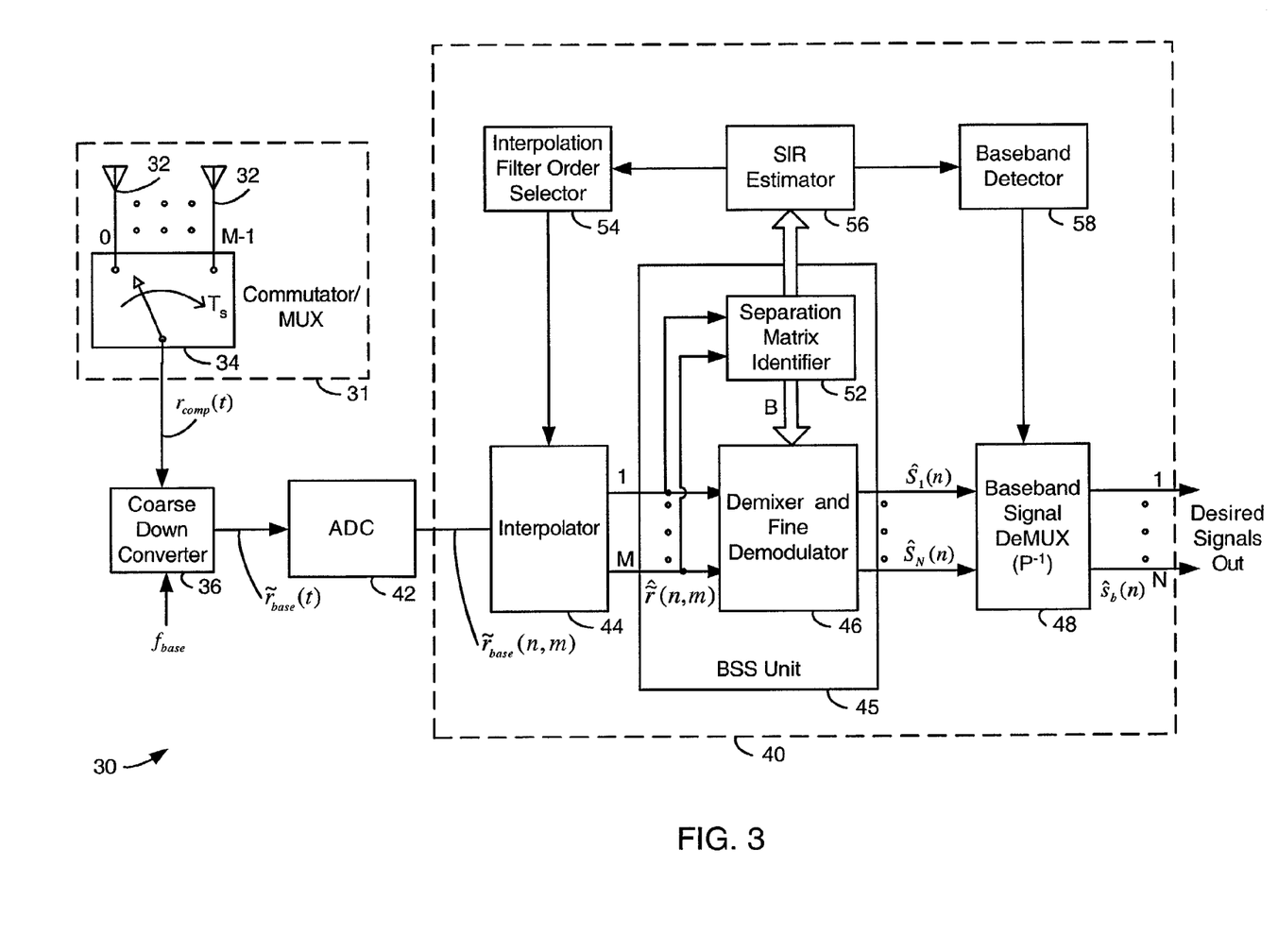
FIG. 3 is a block diagram of a communication signal receiver.

FIG. 3 is a block diagram of a communication signal receiver. The receiver 30 includes a time-multiplexed array antenna 31 a coarse down converter 36, an analog to digital converter (ADC) 42, and a signal separation network 40, which in most modern receivers will be implemented in a digital signal processor (DSP).

The array antenna 31 includes antenna elements 32 and a commutator or multiplexer 34. The output of each antenna element 32 is time-multiplexed onto a single RF to baseband signal path as a single multiplexed signal and then digitally reconstructed. In known M-element antenna arrays, M down conversions to baseband are required. Therefore, the receiver 30 eliminates M−1 down conversion blocks as compared to known receivers.

In order to create a composite antenna output, the output $r_m(t)$ from each sensor element or antenna is multiplied by a series of time synchronized gating pulses $g_m(t)$ and the output added to a common signal. Thus, the composite antenna output $r_{comp}(t)$ at the commutator/multiplexer 34 output is:

$$r_{comp}(t) = \sum_{m=0}^{M-1} r_m(t) g_m(t) \quad (16)$$

where $g_m(t) = g_{gate}(t) \otimes \delta_{comb}\left(t - m\frac{T_s}{M}\right)$;

$$g_{gate}(t) = \begin{cases} 1 & \text{for } 0 \leq t \leq \frac{T_s}{M} \\ 0 & \text{elsewhere} \end{cases};$$

$$\delta_{comb}(t) = \sum_{q=0}^{\infty} \delta(t-qT_s);$$

⊗ denotes the convolution operation;

δ(t) is the Dirac delta function; and $T_s$ is the baseband sample period.

The composite signal $r_{comp}(t)$ is then input to coarse down converter 36 and subjected to a coarse down conversion process by a frequency of $f_{base}$, to give the baseband equivalent signal whose complex envelope is represented by $\tilde{r}_{base}(t)$. It will be apparent to those skilled in the art that down conversion by a frequency $f_{base}$ translates all sources in the received signal close to baseband:

$$\tilde{r}_{base}(t) = \tilde{r}_{comp}(t) e^{j2\pi f_{base} t}. \quad (17)$$

This signal is then converted into digital samples by the ADC 42. This may be accomplished for example by sampling $\tilde{r}_{base}(t)$ at a rate of $$Mf_s = \frac{M}{T_s}$$

to give the discrete time signal $\tilde{r}_{base}(n,m)$, at times $$t = \left(n + \frac{m}{M}\right)T_s, n = 0, 1, \ldots,$$

and m=0, ..., M−1, where m indicates the corresponding antenna channel and n is the sample (time) index. The commutator/multiplexer 34 is preferably synchronized with respect to the sampling period $T_s$ so that all baseband equivalent signals $\tilde{r}_m(t)$, m=0, ..., M−1 are each sampled uniformly within the $T_s$ interval.

Subsequent to the analog down conversion and analog-digital conversion, the M multiplexed signals contained in $\tilde{r}_{base}(n,m)$ may be de-multiplexed and resynchronized to a common time instant. The signals $\hat{\tilde{r}}(n,m)$, which represent estimates of the complex envelope of the baseband equivalent outputs from all M antennas at synchronous integer sampling instants $nT_s$, are reconstructed from the samples $$\tilde{r}_{base}\left[\left(n+\frac{m}{M}\right)T_s\right],$$

which are obtained at the non-integer sampling instants $$\left(n+\frac{m}{M}\right)T_s.$$

This reconstruction operation involves interpolating the samples of $$\tilde{r}_{base}\left[\left(n+\frac{m}{M}\right)T_s\right]$$

at a fixed m and varying n, to give estimates $\hat{\tilde{r}}(n,m)$ of the complex envelope corresponding to the desired synchronously-sampled baseband versions of the signals $r_m(t)$ in (5), at integer sampling instants.

If $T_s$ satisfies $$\frac{1}{2T_s} \geq f_{max}, \qquad (18)$$

where $f_{max}$ is the relevant band edge of $\tilde{r}_{base}(t)$, then the reconstructed signal generated by interpolator 44 including the interpolated components is given by $$\hat{\tilde{r}}(n-p,m)=t_m\tilde{r}_{base}(n,m)+w_m(n), \qquad (19)$$

where
$w_m(n)$ is interpolation error;
$\tilde{r}_{base}(n, m)$ is a (2p+1)-length vector of samples $$\tilde{r}_{base}\left[\left(i+\frac{m}{M}\right)T_s\right], i=n-2p,\ldots,n;$$

$p \geq 1$ is an integer parameter normally selected to be $1 \leq p \leq 200$; and
$t_m$ is a (2p+1)-element row vector of Dirichlet kernel coefficients whose qth element is equal to $$t_m(q) = \frac{\sin\left(\pi\left(q-p-\frac{m}{M}\right)\right)}{\pi\left(q-p-\frac{m}{M}\right)}, q=1\ldots 2p+1, m=0,\ldots,M-1.$$

By selecting the proper model order p and suitable window function, the interpolation error $w_m(n)$ can be made very small and substituting the real component of the quantity $\hat{\tilde{r}}(n-p, m)$ from (19) for $r(n)$ in expression (7) leads to an acceptable solution. The accuracy of the interpolation procedure can also be improved through the use of such windowing functions as those described in Alan V. Openheim, Ronald W. Schafer with John R. Buck, "Discrete-time Signal Processing", $2^{nd}$. Ed, 1999, Prentice Hall, Upper Saddle River, N.J., USA, 07458.

These modifications lead to the multi-channel radio receiver 30, which includes a single down conversion signal path and several control paths, as described in further detail below.

The down conversion signal path begins at the multiplexed array antenna 31 and ends with the output of the desired data channels at the output of the baseband signal demultiplexer 48. A single multiplexed signal is down converted to a common baseband at 36, converted to a digital signal at 42 and digitally reconstructed into a vector of signals by interpolator 44, as discussed above. Interpolator 44 would normally be implemented as an interpolation filter, as will be apparent to those skilled in the art. The reconstructed signal is then separated into multiple data signals using a blind separation algorithm embodied in the BSS unit 45, and then the desired channels are selected from those available at the demultiplexer 48.

The single multiplexed signal output from the multiplexed array antenna 31 is, as described above, given by expression (17). Conventional down conversion using a common baseband frequency of $f_{base}$, followed by analog-to-digital conversion produces an output vector of time samples $\tilde{r}_{base}(n, m)$ of length 2p+1 from the ADC 42, that in complex envelope form is given by $$\tilde{r}_{base}(n, m)=[\tilde{r}_{base}(n-2p, m) \ldots \tilde{r}_{base}(n, m)],$$
$$m=0,\ldots,M-1, \qquad (20)$$

where $\tilde{r}_{base}(n, m)$ is defined in expression (17).

The signal vector component $\tilde{r}_{base}(n)$ is applied as an input to the mth interpolation filter indicated in expression (19), and a time-aligned output is generated as $$\hat{\tilde{r}}_m(n-p)=t_m\tilde{r}_{base}(n)+w_m(n). \qquad (21)$$

The interpolated signals $[\hat{\tilde{r}}_0(n-p) \ldots \hat{\tilde{r}}_{M-1}(n-p)]^T$ are assembled into a vector $\hat{\tilde{r}}(n)$ representing a single snapshot of synchronous samples. The elements of $\hat{\tilde{r}}(n)$ are samples represented here in complex envelope form from all M antenna outputs, at simultaneous time instants.

A BSS algorithm may then be applied to the signal $\hat{\tilde{r}}(n)$. This is done by computing the matrices $B_w$ and $B_r$ in a manner similar to that indicated in expressions (12) and (13):

$$B_w(n+1)=F(n)B_w(n)-\lambda(n)F(n)[B_w(n)\hat{\tilde{r}}(n)\hat{\tilde{r}}(n)^H B_w(n)^H - I]B_w(n), \text{ and} \qquad (22)$$

$$B_r(n+1)=B_r(n)-\lambda(n)[\upsilon(\hat{s}(n))\hat{s}(n)^H - \hat{s}(n)\upsilon(\hat{s}(n))^H]B_r(n), \qquad (23)$$

where:
the quantity F(n) is defined below;
$B_w$ and $B_r$ are used to give an estimate of the source signals in a manner consistent with (9) as $$\hat{s}(n)=B(n)\hat{\tilde{r}}(n), \qquad (24)$$

where $B(n)=B_r(n)B_w(n)$;
the vector $\hat{s}(n)=[\hat{s}_1(n),\ldots,\hat{s}_K(n)]^T$ is the vector of recovered sources in complex envelope form, from the demixer and fine demodulator 46;
$\upsilon(\bullet)$ is defined in (13); and
$\lambda(n)$ is the adaptation rate parameter.

Since the coarse down conversion operation performed by down converter 36 by the frequency $f_{base}$ does not bring the recovered signals exactly to baseband, it may be desirable to perform a second (fine) down conversion or demodulation operation. As will be apparent, without this fine demodulation step, the recovered sources $\hat{\tilde{s}}_e(n)$ would be given by the expression $$\hat{\tilde{s}}_e(nT_s) = \begin{bmatrix} e^{2\pi\Delta f_1^n T_s} & & & \\ & e^{2\pi\Delta f_2^n T_s} & & \\ & & \ddots & \\ & & & e^{2\pi\Delta f_N^n T_s} \end{bmatrix} \hat{\tilde{s}}(nT_s). \quad (25)$$

If F(n) is defined as $$F(n) = \begin{bmatrix} e^{2\pi\Delta f_1 n T_s} & & & \\ & e^{2\pi\Delta f_2 n T_s} & & \\ & & \ddots & \\ & & & e^{2\pi\Delta f_N n T_s} \end{bmatrix}^{-1}, \quad (26)$$

then the fine demodulation process may be incorporated into the signal separation by the inclusion of F(n) in equation (22). The matrix B becomes a time-varying quantity which inherently performs the desired fine demodulation of the recovered signals to baseband. The frequencies $\Delta f_1 \ldots \Delta f_N$ in F(n) will normally be supplied by control logic (not shown) associated with the receiver 30 in which the signal separation arrangement of FIG. 3 is implemented. As such, F(n) is easily incorporated into the computations for the matrix B with very little additional overhead. This results in a saving of a conventional separate demodulation process.

In the system shown in FIG. 3, three control loops perform several control functions. A first control loop includes the separation matrix identifier 52 and outputs the identified separation matrix to the demixer and fine demodulator 46. Another control loop includes the separation matrix identifier 52, the SIR estimator 56 and the interpolation filter order selector 54. This loop controls the adaptation rate parameter $\lambda(n)$ and interpolation length p. A third loop includes the separation matrix identifier 52, the SIR estimator 56 and the baseband detector 58.

The SIR estimate from estimator 56 is used to determine the adaptation rate parameter $\lambda(n)$ for the separation algorithm in (22) and (23) and the appropriate interpolation filter length p, and to provide a confidence measure for the baseband detector 58. To estimate the relative signal strengths of each separated source signal, the signal outputs from the signal separation network 40 may be scaled to unity power. Consequently, the reciprocal of the squared 2-norm of the kth row $b_k(n)$ of the converged separation matrix B(n) from the separation matrix identifier 52 is an estimate of the power of the kth source.

In order to detect convergence of the separation matrix B(n), a time-varying quantity v(n), which indicates how fast the matrices $B_w$ and $B_r$ from (22) and (23) respectively are changing during adaptation, is preferably used. This quantity is given by $$v(n) = \frac{\text{var}[\text{tr}(B(n)B(n)^H)]}{\text{mean}[\text{var}[\text{tr}(B(n)B(n)^H)]]} \quad (27)$$

where
tr( ) is the trace operator;
var( ) is a short-term estimate of the variance; and
mean( ) is a short-term average.

During the initial phase of adaptation, the matrix B(n) is changing quickly; thus v(n) in (27) has a high value. After convergence is nearly attained, B(n) is almost constant, with the result that v(n) has a low value.

Performance of the signal separation techniques described herein is dependent on the convergence properties of the BSS algorithm. Since the separation algorithm uses a sequential update procedure, the associated adaptation rate parameter $\lambda(n)$ plays a key role. This parameter is preferably adjusted according to the following:

$$\lambda(n) = \lambda_{\min} + \lambda_{range}\left(\frac{1}{1 + \exp(\lambda_{scale} \cdot v(n))}\right), \quad (28)$$

where $\lambda_{min}$, $\lambda_{range}$, $\lambda_{scale}$ are scalar parameters whose values are determined in an empirical manner through experimentation.

The performance is also dependent on the estimation accuracy of the interpolation filter 44. For low signal-to-noise ratio (SNR) conditions, it is important to maximize improvement, so a longer filter (larger p) is used. To support this dynamic operation, the following estimator for p is preferably employed:

$$p = p_{\min} + p_{range}\left(\frac{1}{1 + \exp(p_{scale} \cdot e(n))}\right), \quad (29)$$

where $p_{min}$, $p_{range}$, $p_{scale}$ are experimentally predetermined scalar parameters.

The quantity e(n) in (29) is a second form of estimated SNR value, defined as $$e(n) = \frac{\max_k \|b_k(n)\|_2^2}{\min_k \|b_k(n)\|_2^2}. \quad (30)$$

After convergence, if the number of antenna elements M is greater than the number of sources K, the numerator of (30) is an indication of the power of the strongest source, whereas the denominator is an indication of the background noise power. Since the quantity e(n) is only meaningful after the separation algorithm is nearly converged, the following convergence measure c(n), which is represented as a Boolean variable, is preferably used to test for near-convergence and qualify the use of the measure e(n):

$$c(n) = v(n) < \mu, \quad (31)$$

where
$\mu$ is an empirically-determined scalar threshold.

As described above, v(n) is an indicator of the convergence of the separation matrix. Therefore, the scalar threshold μ may be determined based on a level of convergence at or above which signal separation performance is or is expected to be acceptable.

Parameter p is preferably varied on a block by block basis and evaluated when the condition on c(n) specified in (31) is true. Otherwise, the largest value of $p=p_{min}+p_{range}$ may be used. The ability to adaptively change the parameter p results in improved performance at low values of SNR or in the early phases of adaptation, while at the same time reduces the computational overhead of the algorithm under more favourable operating conditions.

When using BSS algorithms, it is not possible to determine at which output a desired signal appears; i.e., the ordering of recovered signals is subject to an unknown permutation. The baseband detector 58 is used to determine at which output the desired signal appears, based on the knowledge of the channel frequency of the desired signal. The output ordering is resolved in the baseband signal demultiplexer 48, the output of which is the desired signal vector $\hat{s}_b(n)$.

In the demultiplexer 48, each sequence contained in $\hat{s}_b(n)$ is passed through a low pass filter and a short-term average of the output signal power is computed. By choosing $f_{base}$ to be close to the known frequency of the desired channel, the output of the low-pass filter will have a significant signal level only when the filter input corresponds to the desired channel. All other undesired channels will not be centered around baseband, so the filter output in these cases will have a low signal level. The following Boolean variable may be used to test this condition:

$$z_k = \text{level}(l_p(n) \otimes [\hat{s}_b(n)]_k) > \mu_{bb}, \qquad (32)$$

where $l_p(n)$ is the impulse response of a low pass filter with bandwidth less than the channel bandwidth;

$\mu_{bb}$ is an empirically-determined threshold; and $[\hat{s}_b(n)]_k$ is the $k^{th}$ sequence of the vector sequence $\hat{s}_b(n)$.

For each desired signal, an expected or minimum received signal level will normally be known, from which an expected signal level at the output of the BSS unit may be calculated. The threshold $\mu_{bb}$ may therefore be determined as a signal level expected at the output of the BSS unit 45 when the expected or minimum signal level is received by the receiver 30.

If the condition in (32) is true, then $[\hat{s}_b(n)]_k$ is the desired output. Otherwise, then diagonal sequences $f_{ii}(n)$ of the matrix F(n) can be interchanged with $f_{kk}(n)$ until the condition is true. An alternative strategy is to interchange rows of the separation matrix B until the condition on $z_k$ in Expression (32) is true.

To evaluate the performance of the techniques and system described above, a series of simulations were performed over a wide range of conditions. The simulations were performed using Mathworks Matlab™ environment and each block of the diagram in FIG. 3 was modeled. In the simulations, a linear antenna array 31 and fixed length interpolation filters 44 were used.

The basic simulation parameters are listed blow in Table 1. These settings correspond to the case of two users operating about a common basestation in the Mobitex™ mobile communication network. The transmissions could apply to either the base station on an uplink channel or to a mobile device on a downlink channel.

TABLE 1

Typical Simulation Parameters

| | |
|---|---|
| Sampling freq. | 64 KHz |
| GMSK data sources | 2 |
| Bit Rate | 8000 bps |
| Carrier | 920 MHz (12.5 KHz spacing) |
| Channel Amplitude | [−60 . . . 0] dB |
| Source Angle Separation | [2.5 . . . 70] deg. |
| Number of array elements | 2 |
| Element spacing | 0.097728 m |
| Switching delay | 0.011 msec |
| Interpolation filter order | [18 . . . 200] taps |

For each test condition, a number of trials were performed and statistics were accumulated. The key variable for comparison was the degree of improvement due to the signal separation algorithm and system according to the invention. The improvement is defined as the difference between oSIR, the SIR at the output of the signal separation network 40, and iSIR, the SIR at the input to the signal separation network 40. The quantity iSIR may be defined as:

$$iSIR = 10\log\left(\frac{\text{Desired signal power}}{\text{Interfering signal power}}\right) dB, \qquad (33)$$

where the powers are measured at the input to the signal separation network 40, and averaged over all inputs. The quantity oSIR is defined in a similar way, except the powers are measured at the output of the signal separation network 40.

The first series of simulations performed investigated the importance of the filter length employed in the interpolator 44. A series of simulations were performed for a range of filter lengths and iSIR levels. For each combination, a total of 75 trials were conducted and statistics accumulated on the oSIR level achieved at the end of each trial.

Figure 4:
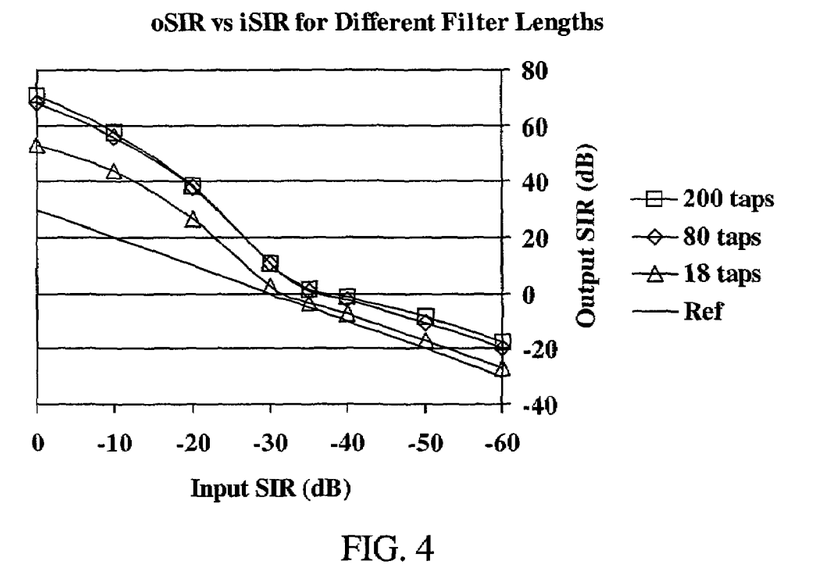
FIG. 4 is a plot of input and output signal interference ratios (SIRs) for different lengths of the interpolation filter 44 of FIG. 3.

FIG. 4 is a plot of input and output signal interference ratios for different lengths of the interpolation filter 44 of FIG. 3. As shown in FIG. 4, at least 30 dB of improvement over the range of iSIR levels tested was exhibited. The reference line, indicated in the legend of FIG. 4 as "Ref", represents a 30 dB level of improvement across the range of SIR values considered. Further, as the filter length is increased, the improvement in oSIR level increases. The largest observed SIR improvement was approxiamtely 42 dB for iSIR levels below −30 dB, for interpolation filters having 80 or 200 taps. However, above this threshold, the improvement increases to as much as 70 dB at iSIR=0 dB. This result motivated the implementation of the SIR estimator 56 and the feedback control to the interpolation filter order selector 54 to dynamically control the length or order of the interpolation filter 44.

Figure 5:
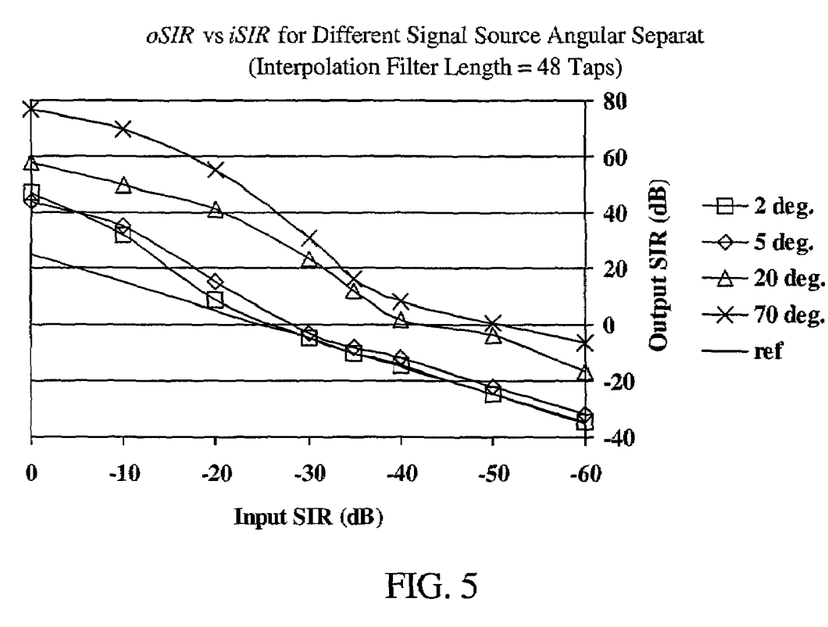
FIG. 5 is a plot of input and output SIRs for different angular separations between desired and interfering signal sources.

Next, the interpolation filter length p was fixed at 48 taps and the iSIR level and the angular separation between the two signal sources was varied. For this test, the angular separation varied over the range 2 to 70 degrees. Again at each setting, 75 trials were performed and statistics accumulated. FIG. 5 is a plot of input and output SIRs for different angular separations between desired and interfering signal sources.

As shown in FIG. 5, as the angular separation between the two sources is reduced, the overall improvement is degraded. However, over the range of conditions tested, the improvement remains greater than about 25 dB, as indicated by the reference line "ref", and each setting shows a threshold near iSIR=−24 dB above which the improvement is greater.

Figure 6:
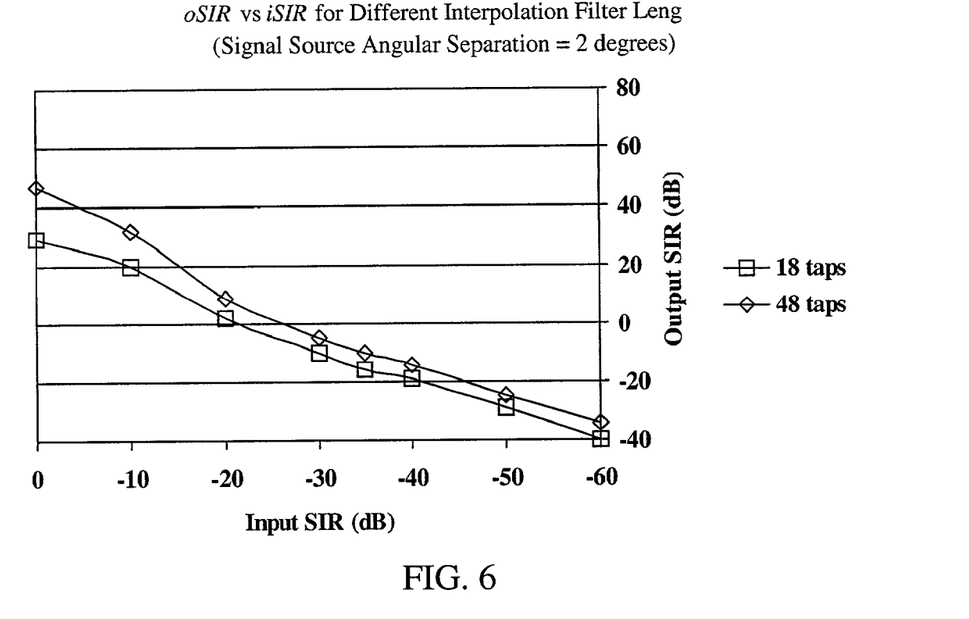
FIG. 6 is a plot of input and output SIRs for different lengths of interpolation filter 44 of FIG. 3, wherein angular separation between desired and interfering signal sources is 2 degrees.

The effect of p for the case where the sources are very close together was also tested. FIG. 6 is a plot of input and output SIRs for different lengths of interpolation filter 44 of FIG. 3, wherein angular separation between desired and interfering signal sources is 2 degrees. Increased interpolation filter length leads to a difference in improvement of 6 dB over the iSIR range of −10 to −60 dB. At iSIR levels above this threshold, the increased filter length leads to a greater difference in improvement relative to the shorter length filter. As described above, adaptively changing parameters provides for better performance in poor conditions and reduced computational overhead in more favorable conditions. For example, at low SIRs, a greater interpolation filter length may be justified. At higher SIRs, signal conditions are superior, such that the additional improvement in output SIR that can be obtained by using a longer interpolation filter is not as crucial. Under good signal conditions, lower filter lengths may therefore be acceptable, and computational overhead may thus be reduced.

Figure 7:
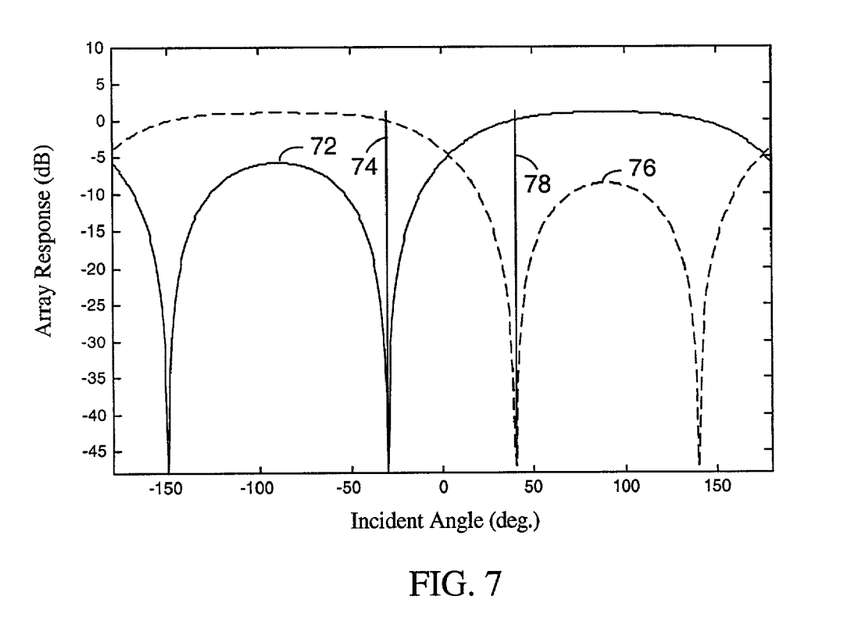
FIG. 7 shows the response of the array antenna 31 of FIG. 3 for two signal sources.

In addition to accumulating statistics on the overall SIR improvement, antenna response was evaluated for each trial. FIG. 7 shows the response of the array antenna 31 of FIG. 3 for two signal sources. When each row of the separating matrix B(n) in (24) is used as a set of weights for a beamformer, the resulting antenna pattern contains a deep null in the direction of one of the sources. FIG. 7 shows the two individual beam patterns 72 and 76 corresponding to the beamformers formed from the K=2 rows of B(n). The true location of the suppressed source for each beamformer is shown by the vertical lines 74 and 78. It is this null in the beam pattern for each source that leads to the suppression of the other source and the ultimate enhancement of the desired source.

The systems and methods described herein may be employed in a mobile communication system such as shown in FIG. 1, for example in the mobile devices 14, 16, 18 and also or instead in the base station 8. Each mobile device 14, 16, 18 may be a hand-held communication device such as disclosed in U.S. Pat. No. 6,278,442, titled "Hand-Held Electronic Device With a Keyboard Optimized for Use With The Thumbs", and issued to the assignee of this application. The disclosure of this patent is hereby incorporated into this disclosure by reference. Other systems and devices in which signal separation techniques described above may be implemented also include, but are not limited to, cellular telephones, personal digital assistants (PDAs) enabled for wireless communications, wireless modems, one-way pagers, two-way pagers, voice communication devices, data communication devices, and dual-mode communication devices, as well as the communications systems that provide service to such mobile devices. In a two-way communication device, a transmitter could be provided with its own antenna. Alternatively, a transmitter may be switchably or otherwise intermittently connected to an antenna element 32 of the array antenna 31 when signals are to be transmitted.

Regardless of the implementation, the systems and methods described above permit simultaneous down conversion of multiple radio channels with arbitrary modulation characteristics. If adjacent channel interference and co-channel interference are viewed as independent signal sources, then application of the transformation described above can separate each desired baseband signal into an individual, low cross-talk signal path for further processing by conventional wireless communication signal receiving circuits. The antenna array and associated BSS system could therefore replace the front-end of virtually any conventional receiver and operate effectively in conjunction therewith. In addition, the ability to simultaneously process multiple channels would also provide for implementation of these systems and methods in communication systems which operate in accordance with emerging standards that employ blocks of blocks of frequency division multiplexed (fdm) channels to support dynamic QoS requirements, such as third generation Global System for Mobile Communications (3G GSM™) systems, wideband code-division multiple access (w-CDMA) systems and reFlex™.

Although described above in the context of a particular example of a BSS algorithm, other types of BSS algorithm may instead be used in conjunction with the receiver and techniques described above.

The antenna array which receives the multiple input signals for the BSS algorithm will be implemented in hardware, whereas the frequency down conversion and signal separation algorithm may be implemented at least partially in software, or in a digital signal processor (DSP) for example.

It will be appreciated that the above description relates to illustrative embodiments by way of example only. Many variations thereof will be obvious to those knowledgeable in the field, and such obvious variations are within the scope of the invention as described and claimed, whether or not expressly described.

What is claimed as the invention is:

1. A communication signal receiver comprising:
    an antenna array having a plurality of M antenna elements, each of the M antenna elements receiving a respective communication signal, and each communication signal comprising a mixture of K source signals from a plurality of K communication signal sources;
    a multiplexer coupled to the antenna array for time multiplexing the M communication signals received by the M antenna elements into a single multiplexed signal;
    a frequency down converter for converting the multiplexed signal to a baseband frequency signal;
    an analog to digital converter configured to sample the baseband frequency signal to produce a digital multiplexed signal comprising a series of samples;
    an interpolator configured to interpolate consecutive samples in the digital multiplexed signal corresponding to each communication signal to generate respective interpolated digital signals, and
    a signal separation network configured to separate the K source signals from the interpolated digital signals;
    wherein the signal separation network comprises a blind signal separation unit.

2. The communication signal receiver according to claim 1, wherein the plurality of K source signals includes at least one desired signal.

3. The communication signal receiver according to claim 2, wherein the plurality of K source signals further includes at least one interference signal interfering with the at least one desired signal.

4. The communication signal receiver according to claim 1, implemented in a base station operating in a mobile communication system.

5. The communication signal receiver according to claim 1, implemented in a mobile communication device.

6. The communication signal receiver according to claim 5, wherein the mobile communication device is a cellular telephone.

7. A method for receiving communication signals, comprising the steps of:
- receiving a plurality of M communication signals, each communication signal comprising an unknown mixture of a plurality of K source signals;
- time multiplexing the plurality of M communication signals into a single multiplexed signal; and
- frequency converting the multiplexed signal to a baseband frequency signal;
- sampling the baseband frequency signal to produce a digital multiplexed signal comprising a series of samples;
- interpolating consecutive samples in the digital multiplexed signal corresponding to each of the M communication signals to generate respective interpolated digital signals, and
- separating each of the K source signals from the interpolated digital signals;
- wherein the step of separating the K source signals comprises the step of performing a blind signal separation operation on the interpolated digital signals.

8. The method according to claim 6, wherein the blind signal separation operation includes the step of demodulating the interpolated digital signals using predetermined communication channel frequencies.

9. The method according to claim 8, wherein the step of performing a blind signal separation operation comprises the steps of:
- determining a separation matrix B(n); and
- estimating the K source signals as $\hat{s}(n)=B(n)\hat{r}(n)$, where
  - $\hat{s}(n)$ is a K by 1 vector comprising estimates of the K source signals, and
  - $\hat{r}(n)$ is an M by 1 vector comprising the M interpolated digital signals.

10. The method according to claim 9, wherein the step of determining the separation matrix B(n) comprises the steps of:
- determining a whitening matrix $B_w$ as $B_w(n+1)=F(n)B_w(n)-\lambda(n)F(n)[B_w(n)\hat{r}(n)\hat{r}(n)^H B_w(n)^H - I]B_w(n)$, where

- F(n) is a matrix dependent upon the predetermined communication channel frequencies,
  - $\lambda(n)$ is an adaptation rate parameter,
  - I is an identity matrix, and
  - H denotes the Hermitian transpose;
- determining a unitary matrix $B_r$ as $B_r(n+1)=B_r(n)-\lambda(n)[\upsilon(\hat{s}(n))\hat{s}(n)^H - \hat{s}(n)\upsilon(\hat{s}(n))^H]B_r(n)$, where

- $\upsilon(\hat{s}(n))$ is a skew-symmetric function; and
- determining the separation matrix $B(n)=B_r B_w$.

11. A wireless communication device comprising:
- a communication signal receiver;
- a communication signal transmitter; and
- an array of M antenna elements, each antenna element receiving a respective communication signal, each communication signal comprising an unknown mixture of a plurality of K source signals generated by a plurality of K signal sources,
- a frequency down converter for converting the multiplexed signal to a baseband frequency signal;
- an analog to digital converter configured to sample the baseband frequency signal to produce a digital multiplexed signal comprising a series of samples; and
- an interpolator configured to interpolate consecutive samples in the digital multiplexed signal corresponding to each communication signal to generate respective interpolated digital signals,
- wherein the receiver comprises:
  - a multiplexer configured to time multiplex the plurality of received communication signals into a single multiplexed signal; and
  - a blind signal separation unit configured to separate each of the K source signals from the multiplexed signal and the blind signal separation unit is coupled to receive the interpolated digital signals.

12. The wireless communication device according to claim 11, wherein the communication signal transmitter is switchably coupled to one of the M antenna elements to transmit communication signals via one of the antenna elements in the array.

13. The wireless communication device according to claim 11, wherein the blind signal separation unit comprises:
- a separation matrix identifier configured to determine a separation matrix B(n); and
- a demixer and fine demodulator configured to estimate the K source signals as $\hat{s}(n)=B(n)\hat{r}(n)$, where
  - $\hat{s}(n)$ is a K by 1 vector comprising estimates of the K source signals, and
  - $\hat{r}(n)$ is an M by 1 vector comprising the M interpolated digital signals.

14. The wireless communication device according to claim 13, wherein the separation matrix identifier is configured to:
- determine a whitening matrix $B_w$ as $B_w(n+1)=F(n)B_w(n)-\lambda(n)F(n)[B_w(n)\hat{r}(n)\hat{r}(n)^H B_w(n)^H - I]B_w(n)$, where

- F(n) is a matrix dependent upon predetermined communication channel frequencies,
  - $\lambda(n)$ is an adaptation rate parameter,
  - I is an identity matrix, and
  - H denotes the Hermitian transpose;
- determine a unitary matrix $B_r$ as $B_r(n+1)=B_r(n)-\lambda(n)[\upsilon(\hat{s}(n))\hat{s}(n)\upsilon(\hat{s}(n))^H]B_r(n)$, where

- $\upsilon(\hat{s}(n))$ is a skew-symmetric function; and
- determine the separation matrix $B(n)=B_r B_w$.

15. The wireless communication device according to claim 14, wherein the blind signal separation unit comprises a digital signal processor (DSP).

16. The wireless communication device according to claim 11, wherein the wireless communication device is a base station in a mobile communication system.

17. The wireless communication device according to claim 11, wherein the wireless communication device is a two-way pager.

18. The wireless communication device according to claim 11, wherein the wireless communication device is a personal digital assistant (PDA).

19. A communication signal receiver comprising:
- an antenna array having a plurality of M antenna elements, each of the M antenna elements receiving a respective communication signal, and each communication signal comprising a mixture of K source signals from a plurality of K communication signal sources;
- a multiplexer coupled to the antenna array for time multiplexing the M communication signals received by the M antenna elements into a single multiplexed signal; and
- a frequency down converter for converting the multiplexed signal to a baseband frequency signal;

an analog to digital converter configured to sample the baseband frequency signal to produce a digital multiplexed signal comprising a series of samples;

a signal separation network configured to separate the K source signals from the multiplexed signal;

wherein the signal separation network comprises a blind signal separation unit.

20. The communication signal receiver of claim 19 wherein consecutive samples in the digital multiplexed signal are interpolated corresponding to each of the M communication signals to generate respective interpolated digital signals.

21. The communication signal receiver according to claim 19, wherein the plurality of K source signals includes at least one desired signal.

22. The communication signal receiver according to claim 19, wherein the plurality of K source signals further includes at least one interference signal interfering with the at least one desired signal.

23. A method for receiving communication signals, comprising the steps of:

receiving a plurality of M communication signals, each communication signal comprising an unknown mixture of a plurality of K source signals;

time multiplexing the plurality of M communication signals into a single multiplexed signal; and frequency converting the multiplexed signal to a baseband frequency signal;

sampling the baseband frequency signal to produce a digital multiplexed signal comprising a series of samples;

interpolating consecutive samples in the digital multiplexed signal corresponding to each of the M communication signals to generate respective interpolated digital signals; and separating each of the K source signals from the interpolated digital signal.

24. The method of claim 23 wherein the step of separating the K source signals comprises the step of performing a blind signal separation operation on the interpolated digital signals.

25. The method according to claim 24, wherein the blind signal separation operation includes the step of demodulating the interpolated digital signals using predetermined communication channel frequencies.

26. The method according to claim 24, wherein the step of performing a blind signal separation operation comprises the steps of:

determining a separation matrix $B(n)$; and estimating the K source signals as $\hat{s}(n)=B(n)\hat{r}(n)$, where $\hat{s}(n)$ is a K by 1 vector comprising estimates of the K source signals, and $\hat{r}(n)$ is an M by 1 vector comprising the M interpolated digital signals.

27. The method according to claim 26, wherein the step of determining the separation matrix $B(n)$ comprises the steps of:

determining a whitening matrix $B_w$ as $B_w(n+1)=F(n)B_w(n)-\lambda(n)F(n)[B_w(n)\hat{r}(n)\hat{r}(n)^H B_w(n)^H - I]B_w(n)$, where F(n) is a matrix dependent upon the predetermined communication channel frequencies, $\lambda(n)$ is an adaptation rate parameter, I is an identity matrix, and H denotes the Hermitian transpose;

determining a unitary matrix $B_r$ as $B_r(n+1)=B_r(n)-\lambda(n)[\upsilon(\hat{s}(n))\hat{s}(n)^H-\hat{s}(n)\upsilon(\hat{s}(n))^H]B_r(n)$, where $\upsilon(\hat{s}(n))$ is a skew-symmetric function; and determining the separation matrix $B(n)=B_r B_w$.

28. A wireless communication device comprising:

a communication signal receiver;

a communication signal transmitter; and an array of M antenna elements, each antenna element receiving a respective communication signal, each communication signal comprising an unknown mixture of a plurality of K source signals generated by a plurality of K signal sources, a frequency down converter for converting the multiplexed signal to a baseband frequency signal;

an analog to digital converter configured to sample the baseband frequency signal to produce a digital multiplexed signal comprising a series of samples; and wherein the receiver comprises:

a multiplexer configured to time multiplex the plurality of received communication signals into a single multiplexed signal; and a blind signal separation unit configured to separate each of the K source signals from the multiplexed signal.

29. The wireless communications device of claim 28 further comprising:

an interpolator configured to interpolate consecutive samples in the digital multiplexed signal corresponding to each communication signal to generate respective interpolated digital signals.

30. The wireless communications device of claim 29, wherein the blind signal separation unit is coupled to receive the interpolated digital signals.

31. The wireless communication device according to claim 28, wherein the communication signal transmitter is switchably coupled to one of the M antenna elements to transmit communication signals via one of the antenna elements in the array.

32. The wireless communication device according to claim 30, wherein the blind signal separation unit comprises:

a separation matrix identifier configured to determine a separation matrix $B(n)$; and a demixer and fine demodulator configured to estimate the K source signals as $\hat{s}(n)=B(n)\hat{r}(n)$, where $\hat{s}(n)$ is a K by 1 vector comprising estimates of the K source signals, and $\hat{r}(n)$ is an M by 1 vector comprising the M interpolated digital signals.

33. The wireless communication device according to claim 32, wherein the separation matrix identifier is configured to:

determine a whitening matrix $B_w$ as $B_w(n+1)=F(n)B_w(n)-\lambda(n)F(n)[B_w(n)\hat{r}(n)\hat{r}(n)^H B_w(n)^H - I]B_w(n)$, where F(n) is a matrix dependent upon predetermined communication channel frequencies, $\lambda(n)$ is an adaptation rate parameter, I is an identity matrix, and H denotes the Hermitian transpose;

determine a unitary matrix $B_r$ as $B_r(n+1)=B_r(n)-\lambda(n)[\upsilon(\hat{s}(n))\hat{s}(n)^H-\hat{s}(n)\upsilon(\hat{s}(n))^H]B_r(n)$, where $\upsilon(\hat{s}(n))$ is a skew-symmetric function; and determine the separation matrix $B(n)=B_rB_w$.

34. The wireless communication device according to claim 33, wherein the blind signal separation unit comprises a digital signal processor (DSP).

35. The wireless communication device according to claim 28, wherein the wireless communication device is a base station in a mobile communication system.

36. The wireless communication device according to claim 28, wherein the wireless communication device is a two-way pager.

37. The wireless communication device according to claim 28, wherein the wireless communication device is a personal digital assistant (PDA).

* * * * *

UNITED STATES PATENT AND TRADEMARK OFFICE
CERTIFICATE OF CORRECTION

PATENT NO.       : 7,047,043 B2
APPLICATION NO.  : 10/163912
DATED            : May 16, 2006
INVENTOR(S)      : Reilly et al.

It is certified that error appears in the above-identified patent and that said Letters Patent is hereby corrected as shown below:

On the title page item (57) Abstract

Line 3, replace "at an atenna" with -- at an antenna --

Column 17, line 22, replace "to claim 6" with -- to claim 7 --

Signed and Sealed this

Twelfth Day of December, 2006

JON W. DUDAS
*Director of the United States Patent and Trademark Office*